United States Patent [19]

McCambridge

[11] Patent Number: 4,859,916
[45] Date of Patent: Aug. 22, 1989

[54] H-DRIVER

[75] Inventor: John M. McCambridge, Northville, Mich.

[73] Assignee: Chrysler Motors Corporation, Highland Park, Mich.

[21] Appl. No.: 200,106

[22] Filed: May 31, 1988

[51] Int. Cl.[4] ............................ H02P 3/08; H02P 1/22
[52] U.S. Cl. ..................................... 318/293; 318/599
[58] Field of Search ............... 318/138, 254, 293, 294, 318/439, 599

[56] References Cited

U.S. PATENT DOCUMENTS

| | | | |
|---|---|---|---|
| 1,805,160 | 5/1931 | Bivens | 318/293 |
| 3,383,574 | 5/1968 | Manteuffel | 318/254 A |
| 4,020,361 | 4/1977 | Suelzle et al. | 318/599 X |
| 4,206,394 | 6/1980 | Flandorfer | 318/294 X |
| 4,454,458 | 6/1984 | Holland | 318/254 |
| 4,494,051 | 1/1985 | Bailey | 318/138 X |
| 4,496,886 | 1/1985 | Gordon et al. | 318/254 |
| 4,523,134 | 6/1985 | Kinoshita et al. | 318/313 |
| 4,680,514 | 7/1987 | Sudler | 318/138 X |

FOREIGN PATENT DOCUMENTS 57-25177  2/1982  Japan .................................. 318/293

Primary Examiner—Bentsu Ro
Attorney, Agent, or Firm—Wendell K. Fredericks

[57] ABSTRACT

A half-bridge driver circuit extends the duration of recirculating decaying currents in an inductance type indicating gauge after source voltage is cutoff. An inverter circuit controls a source transistor to provide a lower resistance path for the decay current than provided by the suppression diodes of the half-bridge driver.

3 Claims, 2 Drawing Sheets

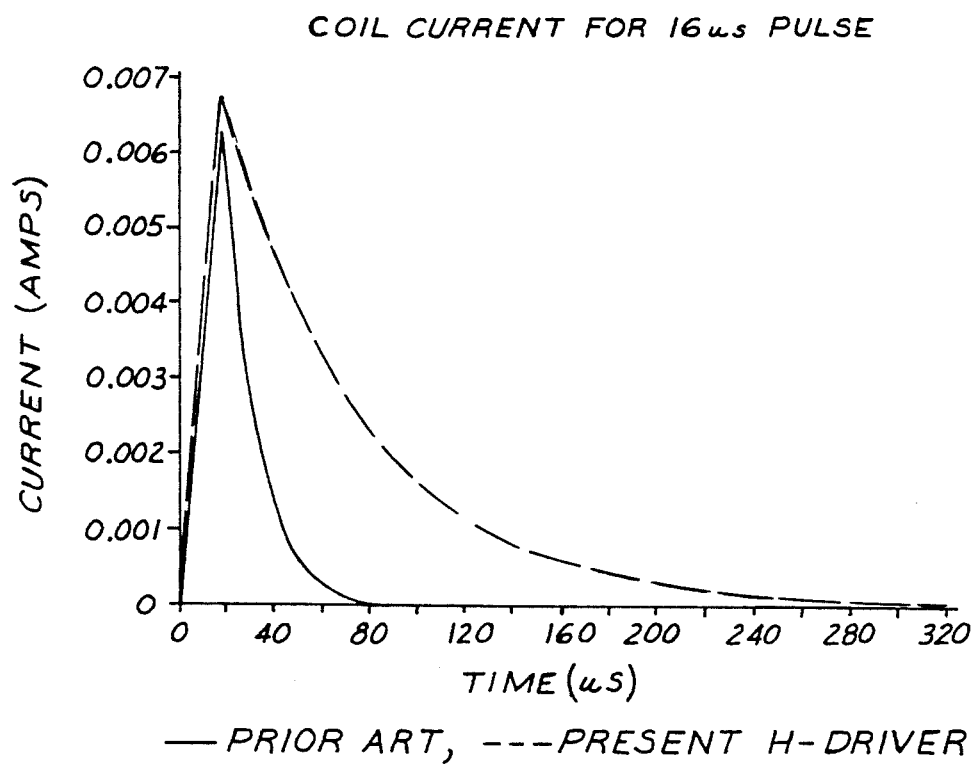

H-DRIVER

BACKGROUND OF THE INVENTION

1. Field of the Invention

The present invention relates to H-driver modules and more particularly, in a preferred embodiment to H-drivers for driving air-core magnetic gauges.

2. Description of the Prior Art

An air-core gauge normally has a rotor with a magnetic sensitive region disposed perpendicular to an indicating dial shaft and a pair of stator windings; i.e., a COSINE or vertical (V) winding and a SINE or horizontal (H) winding fixedly arranged at right angles about the shaft. The gauge has a dial and a dial needle that moves over quadrants of the dial in response to movement of the rotor.

Prior art dual half-bridge push-pull drivers (H-drivers) control the operation of the air-core gauge in response to a pair of modulated pulse width streams (PWM) and four control logic current direction signals (DIRs) to provide a resultant magnetic field for rotating the rotor. The DIR signals select the direction that current passes through the windings of each half of the bridge to place the needle in each of four quadrants of the dial. The PWM signals, a first and a second positive pulse signal, control the direction and amount the needle moves over the dial within the selected quadrant by causing changes in magnitude of the current passing through each winding.

Modulation of the current in the horizontal and vertical windings respectively vary from 0 to 100% in proportion to related variations of SINE and COSINE wave functions values between 0° and 90° which defines the angular position of the needle on the dial. Current in each winding varies in relation with the ON time duration of the modulated pulse stream to produce resultant magnetomotive force (mmf) vectors; the needle position varying in respect to the vector sum of the SINE and COSINE waves that represent the equivalent % on time the PWM signal.

Illustratively, when a PWM signal applied to a H-winding stays ON 20% of the time, the PWM signal on a V-winding stays ON approximately 97.5% of the time during the same cycle; the current and magnetic field in the V-winding increases while the current and magnetic field of the H-winding decreases causing the rotor to rotate until magnetic quiescence results between the two fields and the magnetic sensitive region of the rotor, deflecting the needle to locate at about 11.25° on the dial. 11.25° corresponds to the vector sum of the COSINE and SINE functions when a 20% duration first PWM signal is applied to the H-winding while 97½% duration second PWM signal is applied to the V-winding.

If the % ON time of the PWM signal on the H-winding changes to 97.5% while the % ON time of the PWM signal on the V-winding changes to 20%, the needle seeks a location of about 78.75° on the dial. Of course, if the % ON time of the two pulse streams change back to the original 20:97.5% or greater, then the quiescent effect of the fields cause the needle to rotate backwards towards the original 11.25° location on the dial.

A problem occurs in the prior art push-pull type H-drivers when an attempt is made to move the needle from, e.g., a 6.4° position to 0° on the dial, or from 83° to 90° on the dial or vice-versa. The needle tends to stick. In these regions of the dial, the % ON time of the pulses have ratios of 5:99.5% or lesser. At these ratios, the magnetic field in the dominant winding appears to swamp or dwarf any effect of the magnetic field of the recessive winding. Hence a quiescent result occurs that seems to bound the magnetic region of the rotor to the dominant field rather than to both fields.

Realizing the needle sticking problem of the push-pull H-driver/air-core gauge circuits, a search for other circuits and schemes to eliminate the problem was initiated. This search resulted in the improved device of the present invention.

SUMMARY OF THE INVENTION

A half-bridge driver circuit provides means for recirculating decaying currents in an inductance type indicating gauge when source voltage to the gauge is cut off. Rather than relying on suppression diode paths to carry decaying currents, an inverter circuit is kept active and used in place of a suppression diode to create a recirculation path for the decay current which slows dissipation of the recirculated currents. By slowing the dissipation of the recirculated current, this action reduces the effect of a dominant magnetic field over a recessive magnetic field of stator windings in the gauge. Thus, the recessive magnetic field maintains some effect in influencing movement of the rotor during operation of the gauge. Hence, the sticking needle problem is virtually eliminated.

BRIEF DESCRIPTION OF THE DRAWING

Referring to the drawing figures in which like numerals represent like parts in the several views:

FIG. 2 is a plot of winding current versus time resulting from a 16μs pulse.

DETAILED DESCRIPTION OF A PREFERRED EMBODIMENT

Figure 1:
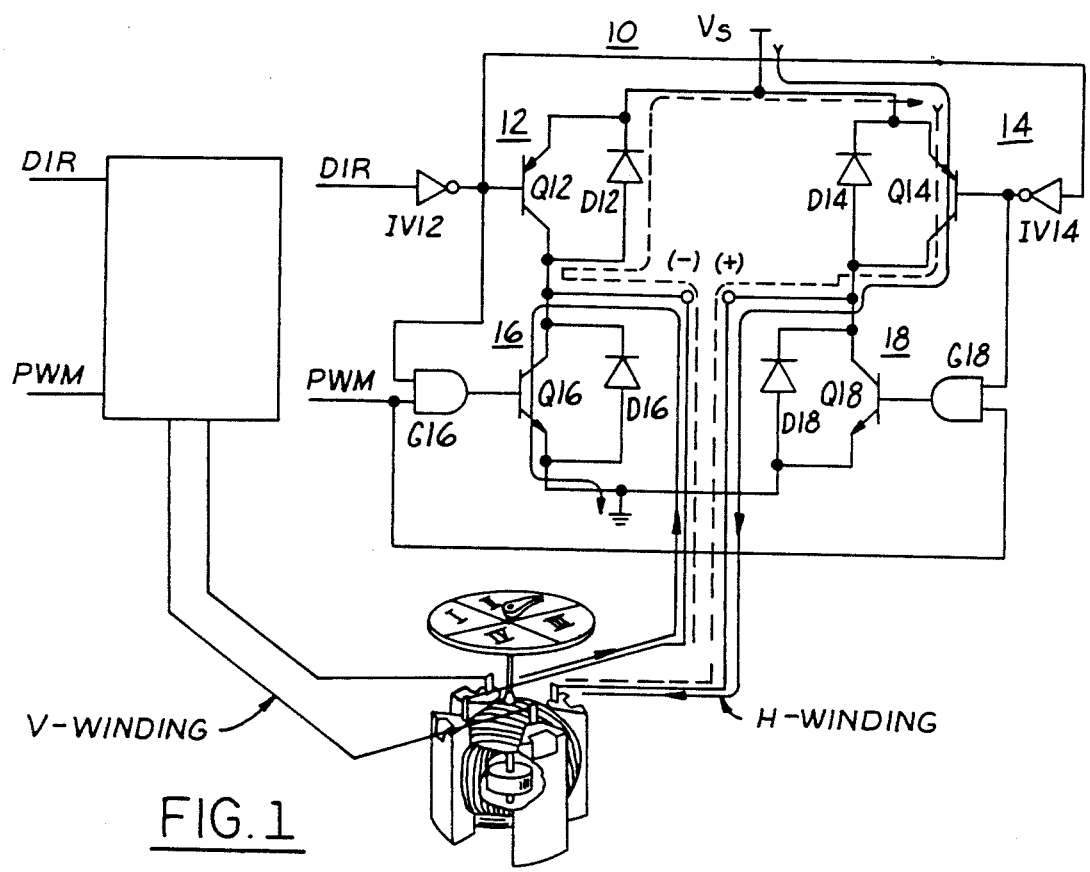
FIG. 1 is a schematic diagram of the H-driver of this invention.
Figure 1A:
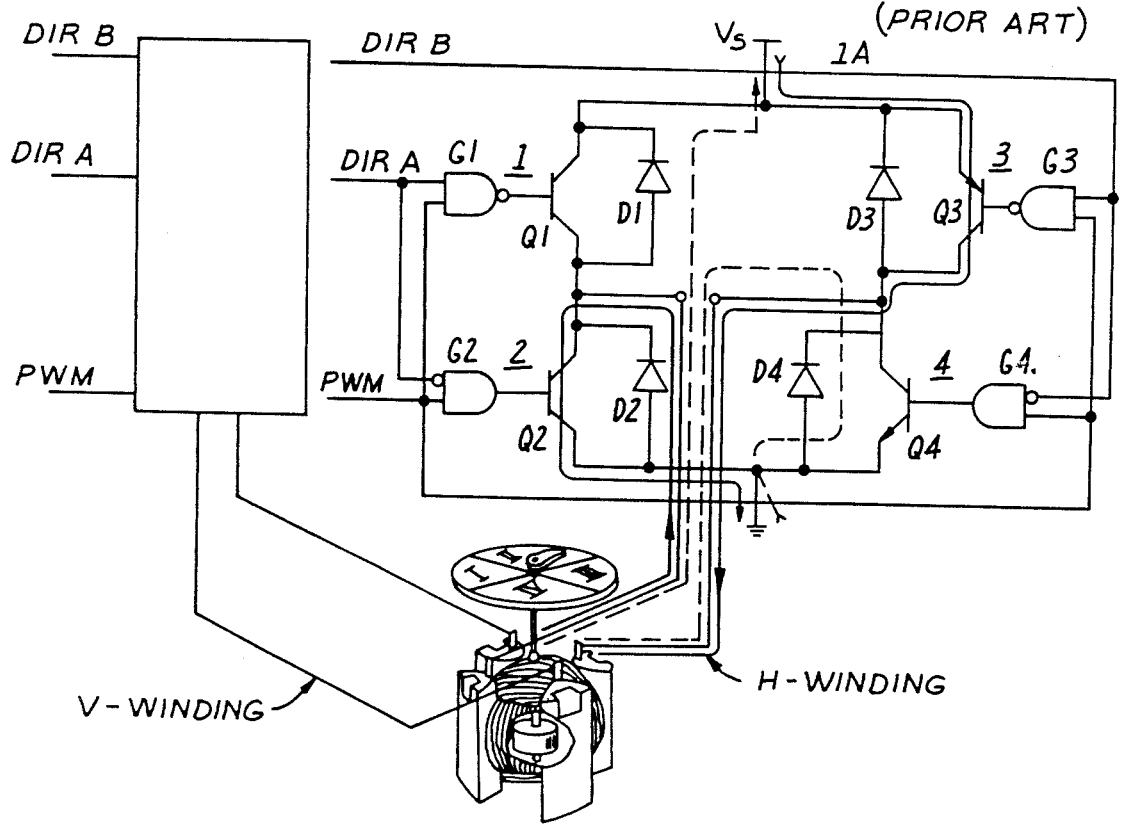
FIG. 1A is a schematic diagram of a prior art H-driver.

With reference to FIG. 1A, a schematic diagram illustrates a recessive H-winding of an air-gore gauge connected in a half-bridge circuit of a prior art H-driver 1A connected for providing bidirectional drive current to the H-winding. Four single drivers require two complimentary DIR logic signals for directing current through the H-winding.

Each H-driver consists of two source output drivers and two sink output drivers. Source output driver 3 used with sink output driver 2 control current in the H-winding as shown by the arrow; Source output driver 1 used with sink output driver 4 control current in the H-winding in a direction opposite to the arrow. Each driver consists of a two-input logic gate, a source or sink transistor and a suppression diode. One input of each logic gate receives the same PWM signal while the other input receives either DIRA or DIRB current direction control signals. In an H-driver configuration, for directing the current through the H-winding in the direction of the arrow, DIRB at a logic ONE is applied to the other input of gates G3 and G4 while DIRA at a logic ZERO is connected to gates G1 and G2.

When the V-winding magnetic field dominates the recessive H-winding, the duration of the OFF time of the PWM signal applied to the V-winding circuits rivals the ON time of the PWM signal applied to the H-winding circuits. The ON time of the PWM going to the recessive H-winding occurs, e.g., for about 16 microseconds as illustrated in FIG. 2.

With the DIRA and DIRB signals at logic ZERO and logic ONE, respectively in FIG. 1A, the PWM pulse signals turn ON source output transistor Q3 and sink transistor Q2 to drive current through the H-winding in the direction shown by the solid line. When the OFF time of the PWM signal occurs, the ZERO reference portion of the PWM signal cuts off all four transistors of H-driver 1A and the current going through the H-winding. Hence, the change in current in the cut-off H-winding produces an electromotive force (EMF) in the same direction as the current flow. This causes the polarity of the voltage across the H-winding to reverse generating a voltage spike since the current in the circuit cannot change instantaneously. The EMF produces a recirculation current that travels over a recirculation path shown by the dotted line, through suppression D1, the supply voltage terminal (Vs) the ground return terminal, the suppression diode D4, the H-winding and again through D1 and Vs. The recirculation current decays rather rapidly because of the rather high resistance of the external source and sink output paths.

As shown in FIG. 2, the solid line drawing of the charge and discharge of the 16 microsecond pulse on the H-winding, indicates that the recirculating current remains ON for only about 64 microseconds. This short duration of the current in the H-winding accounts for the minuscule movement of the dial needle when the magnetic field produced by the V-winding is vectorially summed with the small magnetic field of the H-winding.

With reference now to FIG. 1, there is shown an H-driver embodiment 10 of the present invention. Four driver circuits interconnected so that circuits 12 and 18 act as source and sink output circuits respectively for the H-driver for driving current through the H-winding in the direction opposite the arrow while circuits 14 and 16 act as source and sink output circuits for driving currents through the H-winding in the direction of the arrow.

Each source output driver circuit includes an inverter; i.e., circuit 12 uses the low output of inverter IV12 to turn ON source output transistor Q12 and to supply an input to inverter IV14 so that the output of IV14 turns OFF source output transistor Q14 for a HIGH DIR signal. The opposite reaction occurs for a LOW DIR signal.

The output of IV12 when HIGH enables AND gate G16 so that the positive pulses of the PWM signal can turn ON sink output transistor Q16. The HIGH output of IV12 causes the output of IV14 to disable the input of AND gate G18 keeping the PWM signal from affecting sink output transistor Q18. Unlike the prior art devices, the PWM signals in the present inventive device operates only the sink output transistors.

LOW portions of the PWM pulses cut off both sinking transistors Q16 and Q18 while the active source output transistor Q14 remains ON since the state of the DIR signal applied to the inverter remains the same the drive current through the H-winding follows the path in the direction shown by the solid line.

Having the active source output transistor Q14 stay ON during LOW portions of the PWM pulses allows the recirculation currents to seek a path through Q14 as shown by the dotted line path in FIG. 1. Using this embodiment, the recirculation current decays slower than the prior art configuration of FIG. 1A because of the lower resistance along the path between the minus end of the H-winding, suppression diode D12, through Q14 and through the plus end of the H-winding back to the minus end of the winding. The opposite reaction occurs when current is directed through H-winding in the opposite direction.

With reference again to FIG. 2, you will note that the discharge time of the present invention is delayed considerably longer than that of the prior art device for a 16 microsecond pulse. One discharge time constant of the prior art device and the current inventive device is 13.11 and 57.23 microseconds respectively. Hence the recirculation current in the prior art device and the present device decays to zero in about 64 and 304 microseconds respectively.

The average current in the H-winding when the prior art device and the current device is 14.6 and 122.1 microamps respectively. These currents are determined by integrating the following equation (1) between 0 and the charge time constant tc and then from the charge time constant to the period T.

$$I_{avg} = 1/T[\int_0^{t_c} i_c(t)dt + t_c \int^t i_d(t)dt] \quad (1)$$

where:
T = period of wave form
$t_c$ = charge time constant
ic(t) = equation of current during charging
id(t) = equation of current during discharge.

When the H-winding or COSINE winding is at 16 microseconds, the V-winding or SINE winding is at about 100% on time. Hence, for the prior art device of FIG. 1A, the average current for the SIN and COSINE windings are 58 milliamps and 14.6 microamps respectively. The average current for the same windings when the present device is used are 58 milliamps and 122.1 microamps.

The angular deflection for the prior art device can be found by solving equation (2).

$$\begin{aligned}\text{Angular Deflection} &= \tan^{-1}(I\cos/I\sin) \\ &= \tan^{-1}(24.6 * 10^{-6}/58 * 10^{-3}) \\ &= 0.01 \text{ degree deflection}\end{aligned} \quad (2)$$

For the present device, substituting comparable currents in equation 2, yields an angular deflection of 0.12 degree.

For a comparison of the performance of the prior art device and the device of this invention as a result of the 16 microsecond pulse being applied to the H-winding, refer to Table 1.

TABLE I

| Summary of Performance | | |
|---|---|---|
| | Prior Art Device | Invention Device |
| Charge Time | 16 μs | 16 μs |
| Discharge Time | 64 μs | 304 μs |
| IAvg SINE Winding | 58 ma | 58 ma |
| IAvg COSINE Winding | 14.61 μa | 121.1 μa |
| Angular Deflection | 0.01° | 0.12° |

With such small current in the prior art case because of the highly resistive decay path, the current dies off quickly, thus resulting in a small average current. In the prior art case, 14.6 μa only produces a 0.01 degree deflection which is not noticeable. The H-driver of this invention, however, has a higher average current because of the low resistance decay path which produces a deflection of 0.12 degree.

While a preferred embodiment of the present invention has been shown and described, it will be obvious to those skilled in the art that various modifications and substitutions may be made without departing from the spirit of the invention which is to be limited only within the scope of the appended claims.

I claim:

1. A half-bridge driver circuit for recirculating decaying currents in an inductance type indicating gauge when a source voltage supply to said gauge is switched off, wherein said gauge includes a rotor with a magnetic sensitive region disposed perpendicular to an indicating dial shaft with a dial needle attached at one end and a pair of stator windings, fixedly arranged at right angles about said shaft, wherein said rotor rotates said needle in response to magnetic fields generated when current passes through said pair of stator windings, said circuit includes:

(a) means for applying voltage from the supply to said half-bridge drive circuit so as to generate the magnetic fields in said pair of stator windings;

(b) means for sinking a direct current to a ground potential of the supply in response to ON times of a modulated pulse signal applied to said drive circuit for maintaining the generated magnetic fields in the stator windings;

(c) means for recirculating a decaying current in said stator windings for a desirable period when said means for sinking the direct current is cut off during OFF times of the pulse signal;

said decaying current recirculating means including (1) means for maintaining the capability to apply voltage to said pair of stator windings after the secession of the applied voltage in a manner providing low resistance current paths which opposes dissipation of the decaying currents; and (2) means for preventing a dominant magnetic field of one stator winding from inhibiting a recessive magnetic field of an other stator winding from influencing movement of said rotor.

2. A dual half-bridge driver which accepts logic level signals used to control a source voltage output signal from a source voltage and a current sink output signal for driving current through an inductive load in a selected direction, wherein a logic signal is used to indicate a direction that the current is driven through the inductive load, wherein the inductive load is one of a pair of stator windings of a gauge, wherein the pair of stator windings are fixedly arranged at right angles about a rotor with a magnetic sensitive region disposed perpendicular to an indicating dial shaft with an indicating dial attached at one end, wherein said pair of stator windings comprise a horizontally arranged winding that generates a magnetic field that varies in accordance to a SINE function and a vertically arranged winding that generates a magnetic field that varies in accordance to a COSINE function, wherein the magnetic fields of said horizontally arranged winding and said vertically arranged windings interacting to cause said rotor to rotate until magnetic quiescent results between the fields and the magnetic region of the rotor, the magnitude of the fields being dictated by a modulated pulse stream being driven through said windings, the direction of rotation of said rotor being dictated by the vector sum effect of the magnetic fields of said horizontally arranged winding and said vertically arranged winding, said dual half-bridge driver comprising:

(a) a first half-bridge driver including: (1) a first voltage source driver circuit having a first input terminal for receiving the direction logic signal and a second input terminal for receiving the source voltage output signal and producing therefrom a drive current in a first direction at an output terminal connected to a first end of the inductive load in response to the direction logic signal received at the first input terminal, and (2) a first current sink driver circuit having a first input terminal for receiving the modulated pulse stream, a second input terminal for receiving the direction logic signal and a third input terminal connected to a second end of the inductive load to receive the drive current that exits the load and producing therefrom the drive current to a ground return terminal of the source voltage during HIGH portions of the pulses of the modulated pulse stream; and (b) a second half-bridge driver including: (1) a second voltage source driver circuit having a first input terminal for receiving a complimentary direction logic signal and a second input terminal for receiving the source voltage output signal and producing therefrom a drive current at an output terminal connected to a second end of the inductive load for allowing the drive current to pass in a second direction in response to the complimentary direction logic signal at the first input terminal; and (2) a second current sink driver circuit having a first input terminal for receiving the modulated pulse stream, a second input terminal for receiving the complimentary direction logic signal and a third input terminal connected to the first end of the load and producing therefrom the drive current to the ground potential terminal of the source voltage during HIGH portion of the pulses of the modulated pulse stream;

said dual half-bridge driver including: (1) means for simultaneously causing said first and second current sink driven circuits to oppose the flow to the ground potential terminal of the source voltage of a recirculating current that flows in a direction opposite of that of the drive current, the recirculating current generating from back electromotive force energy stored in the load when the drive current passing through the load is interrupted; (2) means for allowing which ever of said first or said second voltage source driver circuit which connects to the end of the load in the forward direction of flow of the recirculating current to return the recirculating current to the source voltage; and (3) means for allowing said first or second voltage source driver circuit to connect to the opposite end of the load to oppose passage of the recirculating current.

3. A half-bridge driver for driving a source output voltage through an inductive load and for sinking an output current from the inductive load to a ground potential in response to a modulated pulse stream and a current direction input signal, said driver comprising;

(a) a first source output transistor for applying the output voltage to a first end of the inductive load;

(b) a second source output transistor for applying the output voltage to an other end of the inductive load;

(c) a first current sink output transistor, which connects to the other end of the inductive load when said first source output transistor applies the output voltage to the first end of the load, for sinking current in the load to the ground potential during the duration of the pulses of the modulated pulse stream;

(d) a second current sink output transistor, which connects to the first end of the inductive load when said second source output transistor applies the output voltage to the other end of the load, for sinking current in the load to the ground potential during the duration of the pulses of the modulated pulse stream;

(e) a first inverter having an input that receives the current direction input signal for providing at an output inverted control signal for turning said first source output transistor ON or OFF in opposite relations to said second source output transistor;

(f) a second inverter having an input connected to the output of said first inverter for providing at an output inverted control signal for turning said second source output transistor ON or OFF in opposite relations to said first source output transistor so that said second source output transistor is turned ON when said first source output transistor is turned OFF and visa versa;

(g) a first summing gate having a first input connected to receive the output of said first invertor and another input connected to receive the modulated pulse stream for providing an output of the modulated pulse stream to an input of said first current sink output transistor, the output from said first summing gate turning ON said first current sink output transistor when said second source output transistor is turned ON, the output from said first summing gate being enabled when the pulses of the pulse streams at the other input are added with the output signal from said first invertor going to the first input;

(h) a second summing gate having a first input connected to receive the output of said second inverter and an other input connected to receive the modulated pulse stream for providing an output of the modulated pulse stream to an input of said second current sink output transistor, the output from said second summing gate turning ON said second current sink output transistor when said first source output transistor is turned ON, the output from said second summing gate being enabled when the pulses of the pulse streams at the other input are added with the output signal from said second invertor going to the first input; and (i) a plurality of suppression diodes, each of which is connected crossed each of said source output transistors and said current sink output transistors so as to oppose current that flows in the same direction as the current that flows through said transistors and to protect said transistors from any back electromotive force energy stored in the load when the current passing through the load is interrupted, the energy generating a recirculation current.

* * * * *

UNITED STATES PATENT AND TRADEMARK OFFICE
CERTIFICATE OF CORRECTION

PATENT NO. : 4,859,916
DATED : August 22, 1989
INVENTOR(S) : John M. McCambridge It is certified that error appears in the above-identified patent and that said Letters Patent is hereby corrected as shown below:

Column 1, line 7, following "and" insert --,--;
         line 33, following "COSINE" insert --,--;
         line 34, change "functions" to read --function--;
         line 34, change "defines" to read --define--.

Column 2, line 2, change "lesser" to read --less--;
         line 5, following "Hence" insert --,--;
         line 48 and 49, change "complimentary" to read --complementary--;
         line 54, change "arrow;" to read --arrow.--

Column 3, line 21, following "(Vs)" insert --,--;
         line 28, following "H-winding" remove --,--;
         line 61, following "ON" insert --,--;
         line 62, change "same the" to read --same. The--.

Column 4, line 23, change "tc" to read --($t_c$)--;
         line 25, change formula (1) to read $$-- I_{avg} = 1/T[\int_{o}^{t_c} i_c(t)dt + \int_{t_c}^{t} i_d(t)dt] --.$$

UNITED STATES PATENT AND TRADEMARK OFFICE
CERTIFICATE OF CORRECTION

PATENT NO. : 4,859,916

DATED : August 22, 1989

INVENTOR(S) : John M. McCambridge

It is certified that error appears in the above-identified patent and that said Letters Patent is hereby corrected as shown below:

Column 5, line 43, change "an other" to read --another--.

Column 6, line 24, change "complimentary" to read --complementary--;
        line 30, change "complimentary" to read --complementary--;
        line 35, change "complimentary" to read --complementary--;
        line 50, change "which ever" to read --whichever--.
        line 67, change "an other" to read --another--.

Column 7, line 29, change "invertor" to read --inverter--.

Column 8, line 7, change "invertor" to read --inverter--;
        line 11, change "an other" to read --another--;
        line 21, change "invertor" to read --inverter--;
        line 23, change "crossed" to read --across--.

Signed and Sealed this

Seventeenth Day of November, 1992

Attest:

DOUGLAS B. COMER

*Attesting Officer*      *Acting Commissioner of Patents and Trademarks*